(12) United States Patent
James

(10) Patent No.: US 7,069,617 B2
(45) Date of Patent: Jul. 4, 2006

(54) PNEUMATIC LOW-PROFILE WIPER SYSTEM FOR TRUCK MIRRORS

(76) Inventor: Wallace James, 2044 Lakeshore Blvd., Jacksonville, FL (US) 32210

( * ) Notice: Subject to any disclaimer, the term of this patent is extended or adjusted under 35 U.S.C. 154(b) by 0 days.

(21) Appl. No.: 10/800,604

(22) Filed: Mar. 16, 2004

(65) Prior Publication Data

US 2005/0204502 A1    Sep. 22, 2005

(51) Int. Cl.
*B60S 1/10* (2006.01)
*B60S 1/44* (2006.01)
*B60S 1/56* (2006.01)

(52) U.S. Cl. ............... 15/250.003; 15/250.29
(58) Field of Classification Search ........... 15/250.003, 15/250.29, 250.3, 250.15
See application file for complete search history.

(56) References Cited

U.S. PATENT DOCUMENTS 3,866,258 A * 2/1975 DeGraw ............... 15/250.29
4,212,091 A * 7/1980 Jones ................... 15/250.003
4,527,301 A * 7/1985 Seitz .................... 15/250.003
4,672,708 A * 6/1987 Williams ............... 15/250.003
4,896,395 A * 1/1990 Bissell .................. 15/250.003

FOREIGN PATENT DOCUMENTS

GB              978450      * 12/1964    ............ 15/250.003

* cited by examiner

Primary Examiner—Gary K. Graham
(74) Attorney, Agent, or Firm—Mark Young, P.A.

(57) ABSTRACT

A wiper system for a truck mirror includes a pneumatic cylinder configured for attachment to a compressed air source. The pneumatic cylinder has an operating rod that is extendable and retractable. It also has a stroke of approximately the width of the mirror. The pneumatic cylinder is configured for front mounting. A low-profile mounting bracket attaches the pneumatic cylinder to the mirror. The mounting bracket is configured for attachment to the front of the pneumatic cylinder and for positioning the front of the pneumatic cylinder adjacent to or abutting a vertical side of the mirror. A wiper blade attaches to the threaded end of the operating rod of the pneumatic cylinder.

7 Claims, 6 Drawing Sheets

PNEUMATIC LOW-PROFILE WIPER SYSTEM FOR TRUCK MIRRORS

BACKGROUND OF THE INVENTION

1. Field of the Invention

This invention generally relates to truck mirrors, and more particularly, to a pneumatically powered wiper system for cleaning truck mirrors.

2. Background Description

The use of wiper assemblies for truck mirrors is known in the art. Specifically, known prior art wiper assemblies include complex mechanical drive trains and linkages, and bulky, expensive and unattractive mounting systems.

Assemblies with intricate arrangements of mechanical components result in relatively high cost and reliability problems. The may also require substantial modifications to conventional truck mirror housings, making it impractical to retrofit existing mirrors.

Assemblies with bulky and unattractive mounting systems have not achieved widespread acceptance by truckers. Aside from being an eyesore, such systems may interfere with adjustability of mirrors, dramatically increase cost and impair visibility around the mirror. Such mounting systems also tend to be difficult to install.

The invention is directed to overcoming one or more of the problems as set forth above.

SUMMARY OF THE INVENTION

In one aspect of the invention, an exemplary wiper system (such as, by way of example, a kit) for a truck mirror is provided. The system includes a pneumatic cylinder configured for attachment to a compressed air source. The pneumatic cylinder has an operating rod that is extendable and retractable. It also has a stroke of approximately the width of the mirror. The pneumatic cylinder is also configured for front mounting.

The exemplary system also includes a mounting bracket for attaching the pneumatic cylinder to the mirror. The mounting bracket is configured for attachment to the front of the pneumatic cylinder and for positioning the front of the pneumatic cylinder adjacent to or abutting a vertical side of the mirror.

Furthermore, the exemplary system includes a wiper mount. The wiper mount is configured for attaching a wiper blade to the operating rod of the pneumatic cylinder.

In a second aspect of the invention, an exemplary wiper system mounted to a truck mirror is provided. The system includes a pneumatic cylinder operably coupled to a compressed air source. The pneumatic cylinder has an operating rod that is extendable and retractable and a stroke of approximately the width of the mirror. The pneumatic cylinder is also configured for front mounting.

A mounting bracket attaches the pneumatic cylinder to the mirror. The mounting bracket is attached to the front of the pneumatic cylinder and positions the front of the pneumatic cylinder adjacent to or abutting a vertical side of the mirror. A wiper mount attaches a wiper blade to the operating rod of the pneumatic cylinder.

In a third aspect of the invention, a mirror-mounted wiper system is comprised of a pneumatic cylinder that is operably coupled to a compressed air source, has an operating rod that is extendable and retractable, has a stroke of approximately the width of the mirror and is configured for front mounting. The system also includes a low-profile means for mounting the pneumatic cylinder to the mirror. The means for mounting the pneumatic cylinder to the mirror is attached to the front of the pneumatic cylinder and positions the front of the pneumatic cylinder adjacent to or abutting a vertical side of the mirror. The system also includes a means for mounting a wiper blade to the operating rod.

BRIEF DESCRIPTION OF THE DRAWINGS

The foregoing and other objects, features and advantages of the present invention will become better understood with reference to the following description, appended claims, and accompanying drawings, where:

DETAILED DESCRIPTION

Figure 1:
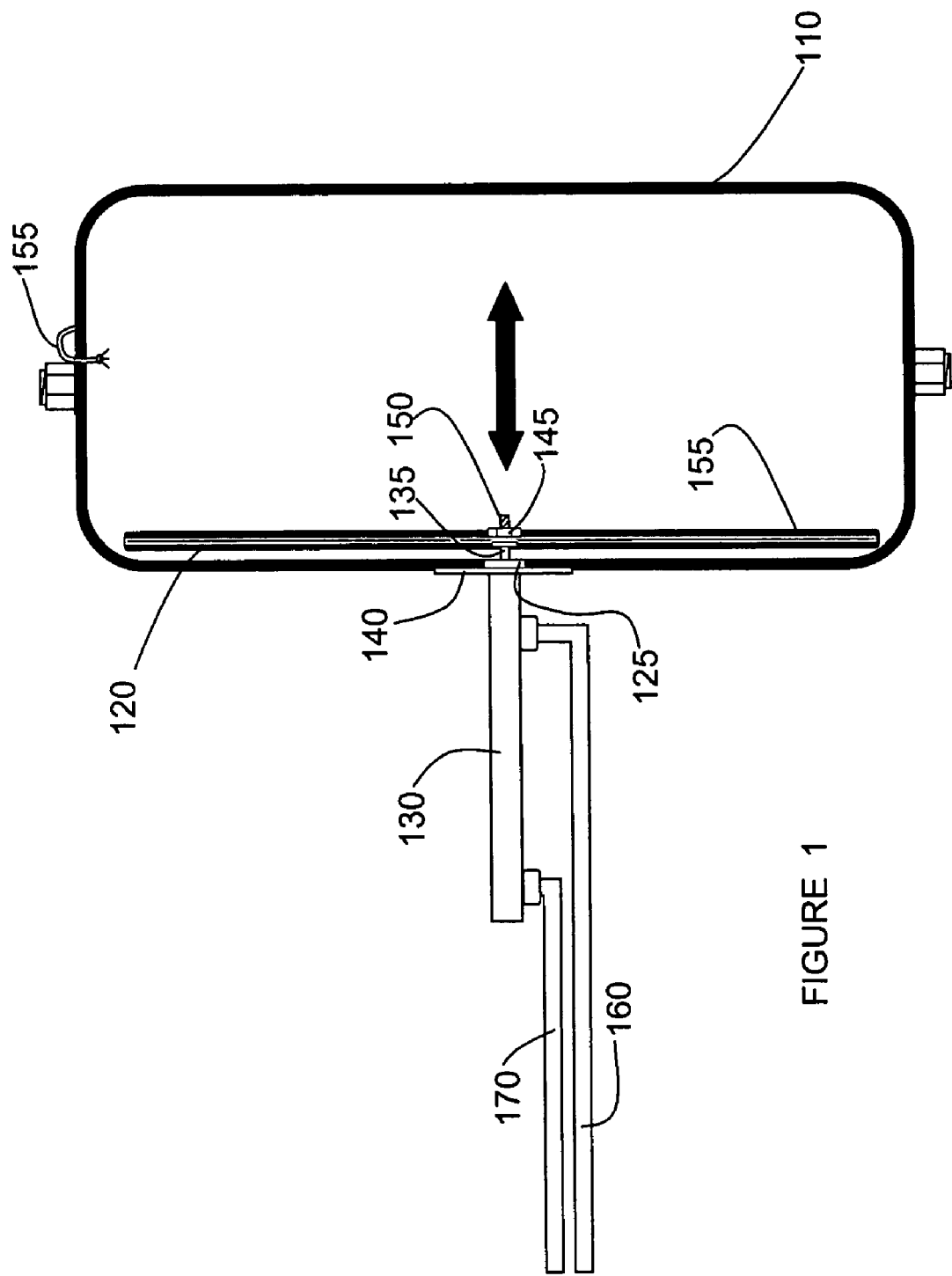
FIG. 1 conceptually shows the mirrored (front) side of a truck mirror equipped with a wiper system in accordance with an exemplary embodiment of the invention.

With reference now to FIG. 1, an exemplary wiper system in accordance with the principles and concepts of the present invention is shown. The system employs a pneumatic cylinder 130 to force a wiper blade 155 across the viewing surface of a conventional truck mirror to wipe away water, snow, ice, dirt and debris from the viewing surface of the mirror.

Figure 2:
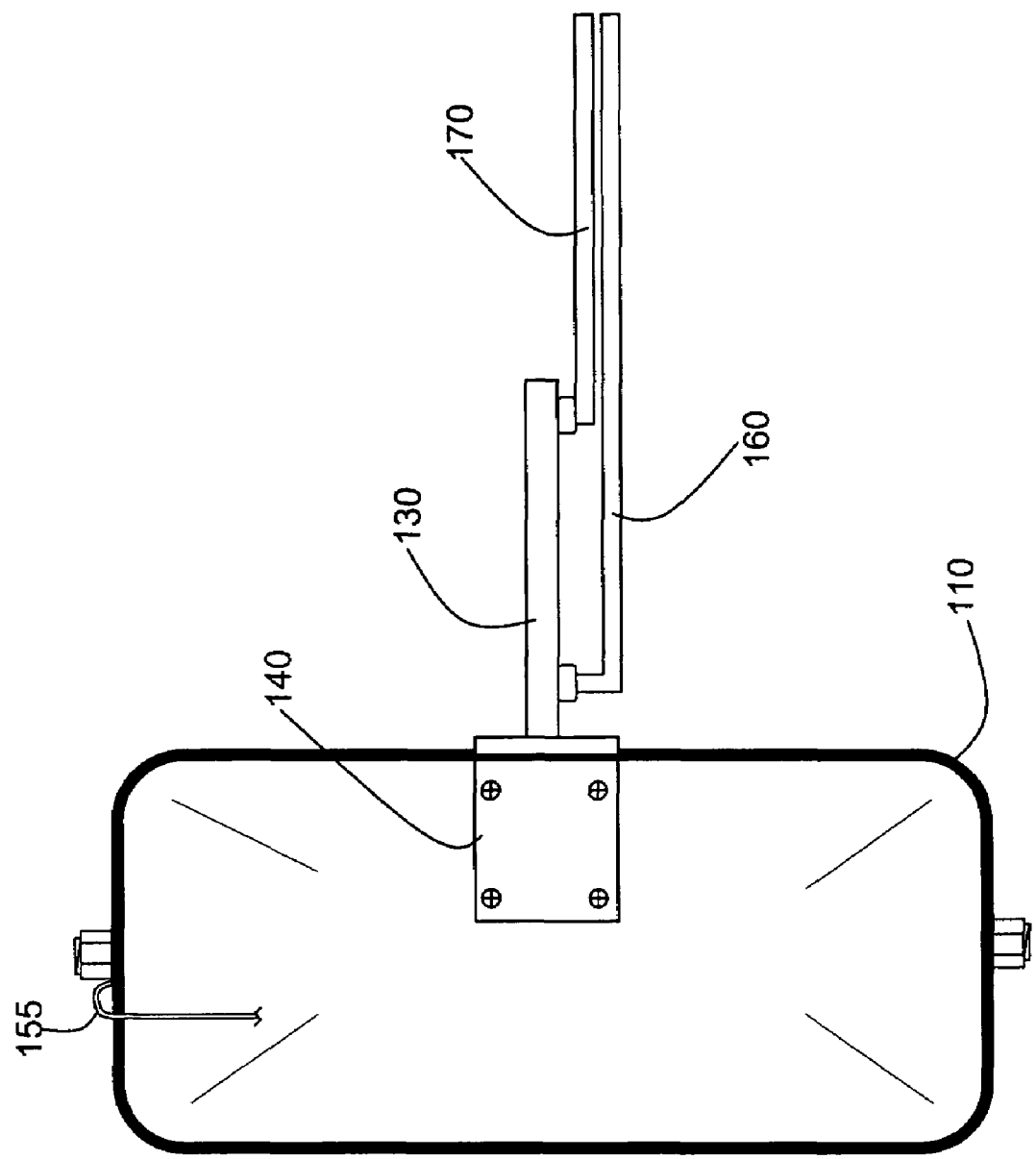
FIG. 2 conceptually shows the back side of a truck mirror equipped with a wiper system in accordance with an exemplary embodiment of the invention.
Figure 3:
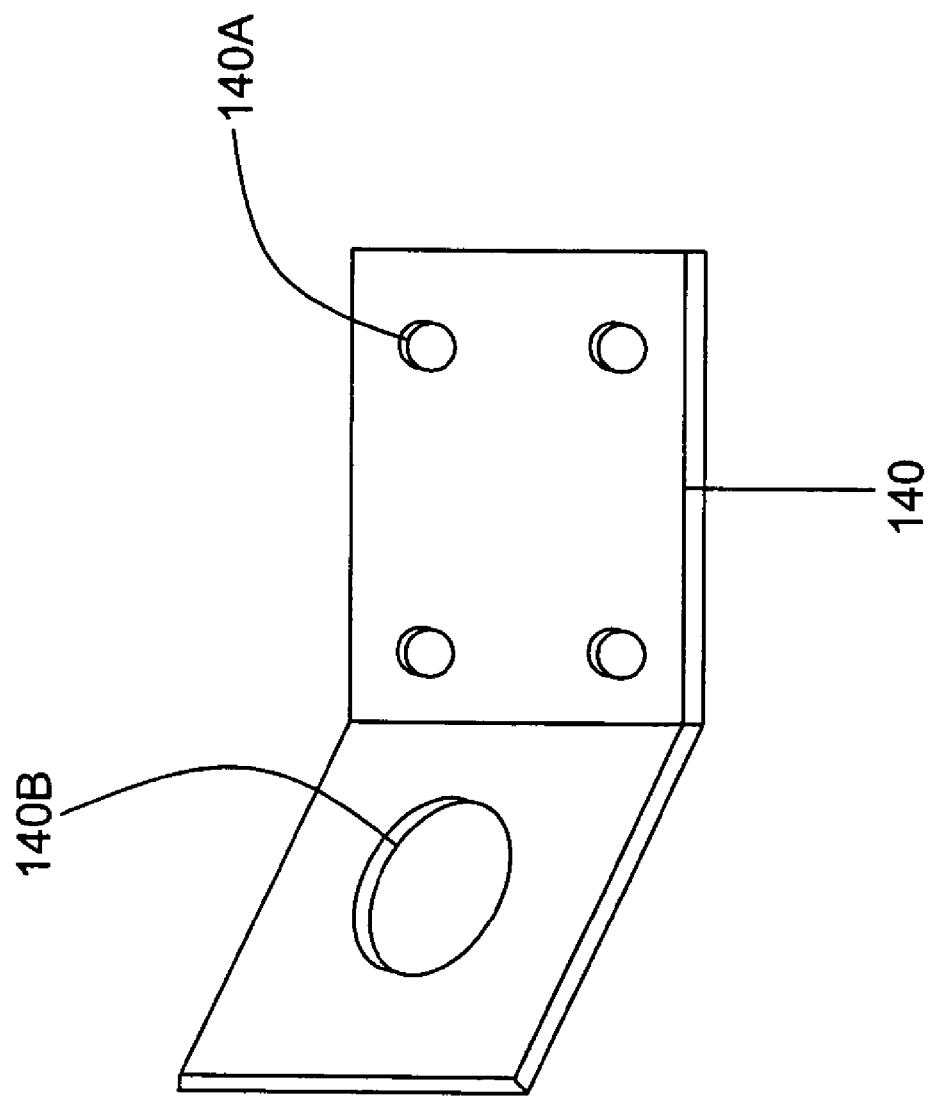
FIG. 3 conceptually shows an angled mounting bracket for mounting a pneumatic cylinder to a mirror in accordance with an exemplary implementation of the invention.

A mounting bracket 140 secures the pneumatic cylinder 130 to the truck mirror 110. An exemplary mounting bracket 140 is an angled (e.g., approximately 90 degrees) unitary (i.e., one-piece) structure configured to support the pneumatic cylinder adjacent to the mirror, as shown in FIG. 3. In particular, the mounting bracket 140 should securely position the pneumatic cylinder 130 so that the extendable operating rod (not shown) of the pneumatic cylinder moves in a direction parallel to the surface of the mirror 110, and the distance between the path of cylinder travel and the surface of the mirror is sufficient to accommodate a wiper blade mount 150 and a wiper blade 155. An exemplary bracket 140 includes a means for attaching the pneumatic cylinder 130, such as a mounting hole 140B or other attachment features that enable secure fastening of the pneumatic cylinder 130 to the bracket. In a preferred embodiment, the mounting hole 140B is oblong or oval to allow adjustment of the position of the cylinder 130. The exemplary bracket 140 also includes a plurality of mounting holes 140A for securing the bracket to the mirror, such as to the backside of the mirror 110 housing as shown in FIG. 2. The bracket may be secured using conventional attachment means, such as a plurality of rivets or screws threaded into small holes drilled into the backside of the mirror housing.

Advantageously, the exemplary mounting bracket 140 provides a low-profile, non-interfering, relatively inexpensive and easy-to-install means for attaching the pneumatic cylinder 130 to the mirror 110. The angle of the bracket 140 may be adjusted by bending to accommodate various mirror and wiper blade configurations. The exemplary bracket 140 is comprised of a single piece of angled material, such as stainless steel, aluminum or other suitable materials. It may be manufactured using conventional machining processes and materials. As the exemplary bracket 140 does not extend far from the surface of the mirror 110, is smaller than the mirror in height and width and will not interfere with the tubular framework for supporting a truck mirror (i.e., it is low-profile), it does not appreciably impede visibility around the mirror 110 or interfere with movement of the mirror. This is important for safety, insurability and positioning. Should it be necessary to adjust the mirror to change the viewing angle, the pneumatic cylinder 130 may be used as a handle to effect the adjustment, thus facilitating (not impeding) adjustment. Furthermore, the bracket 140 can be readily attached to most truck mirrors 110.

The pneumatic cylinder 130 is preferably a dual-action air cylinder having dual pressure chambers and providing pneumatic power on both extension and retraction. However, single action cylinders, which provide pneumatic power only on the extension or "push" stroke and use an internal spring to return the piston to its original position in preparation for the next stroke, may also be used without departing from the scope of the invention. The stroke length of the pneumatic cylinder 130 should be approximately the width of the mirror, e.g., about six inches (i.e., the distance from one vertical side to the other vertical side of the mirror). The pneumatic cylinder 130 should be configured for front mounting (such as front nose or block mounting, as such mountings are known in the art) so that it engages the bracket 140 at mounting hole 140B adjacent to the mirror. The front of the pneumatic cylinder 130 is the end from which the operating rod 135 extends. As relatively little force is required to move a wiper blade, a relatively small diameter (i.e., 5/16 to 1-inch bore) cylinder is preferred to minimize obstruction to visibility. Additionally, double-action cylinders are preferred over single action cylinders because double action cylinders are shorter since they do not require a spring return mechanism. A rod boot, i.e., bellows that fit around the piston rod and expand and contract as the rod moves, may also be provided to protect the pneumatic cylinder 130 from dirt and moisture.

Figure 5:
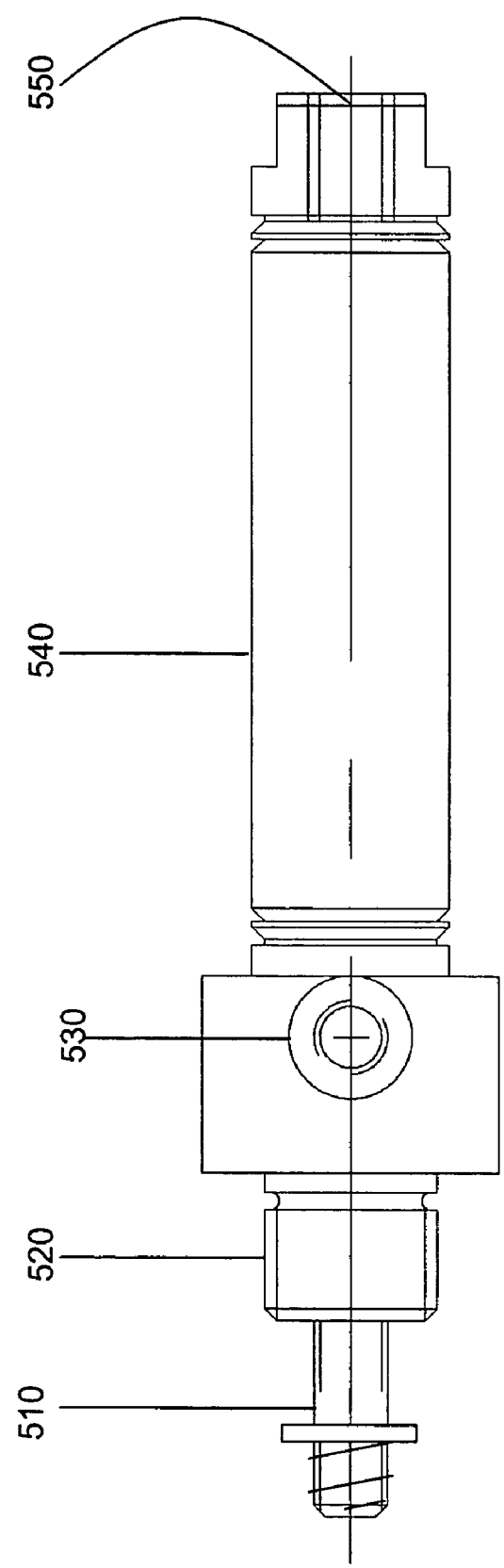
FIG. 5 shows a pneumatic cylinder in accordance with an exemplary implementation of the invention.

Referring now to FIG. 5, a side view of an exemplary double-action cylinder is provided. An extension port 550 and retraction port 530 are provided for receiving air lines using conventional fittings. The cylinder body contains the enclosed piston mechanism. A threaded collar 520 secures the cylinder at the nose end to an object such as a mounting bracket 140 equipped with a mounting hole 140B. The collar 520 may be threadedly removed and replaced to securely fasten the cylinder to the mounting bracket 140 through the mounting hole 140B. Other cylinders such as cylinders with other nose-mounting hardware and port locations may come within the scope of the invention. The exemplary operating rod (also known as an actuator rod or arm) preferably includes a threaded end for engaging a wiper blade, though operating rods with other types of ends may be used without departing from the scope of the invention.

Air lines 160 and 170 supply air to the pneumatic cylinder for the extension (170) and return (160) strokes. The air lines 160 and 170 may be comprised of conventional flexible pneumatic tubing used on trucks. Depending upon the particular cylinder, the ports for connecting air lines 160 and 170 may be located in various positions on the cylinder. Conventional couplings are used to connect the air lines 160 and 170 to the pneumatic cylinder 130. For aesthetic purposes, the air lines 160 and 170 may be substantially hidden within the tubular framework used to support the mirror. Compressed air is supplied from a conventional source of compressed air on a truck (e.g., the source of pressurized air for conventional air brakes).

A three-position valve or switch (such as the exemplary toggle switch shown in FIG. 6), preferably located within the cab of the truck, controls the introduction of compressed air into the air lines. Such switches are commonly used to control pneumatic equipment and accessories in trucks. The switch includes an inlet port 630 for receiving compressed air, a first outlet port 610 for directing compressed air to a first air line, a second outlet port 630 for directing compressed air to a second air line. By way of example and not limitation, toggling the switch to position 650 admits air through a first air line (such as air line 170) to cause a forward (extension) stroke of the piston and operating rod, thereby moving the wiper blade across the mirror. The return or pull stroke is effected by toggling the switch the other way to position 670 to admit air through the other air line (such as air line 160) to cause a rearward (return) stroke of the piston and operating rod, thereby returning the wiper blade to its original position. When in the default off position 660, the switch prevents flow of compressed air through either outlet. Conventional bleeder ports (not shown) on the switch may be adjusted as necessary to vent the relief pressure on the low pressure side of the piston.

Figure 6:
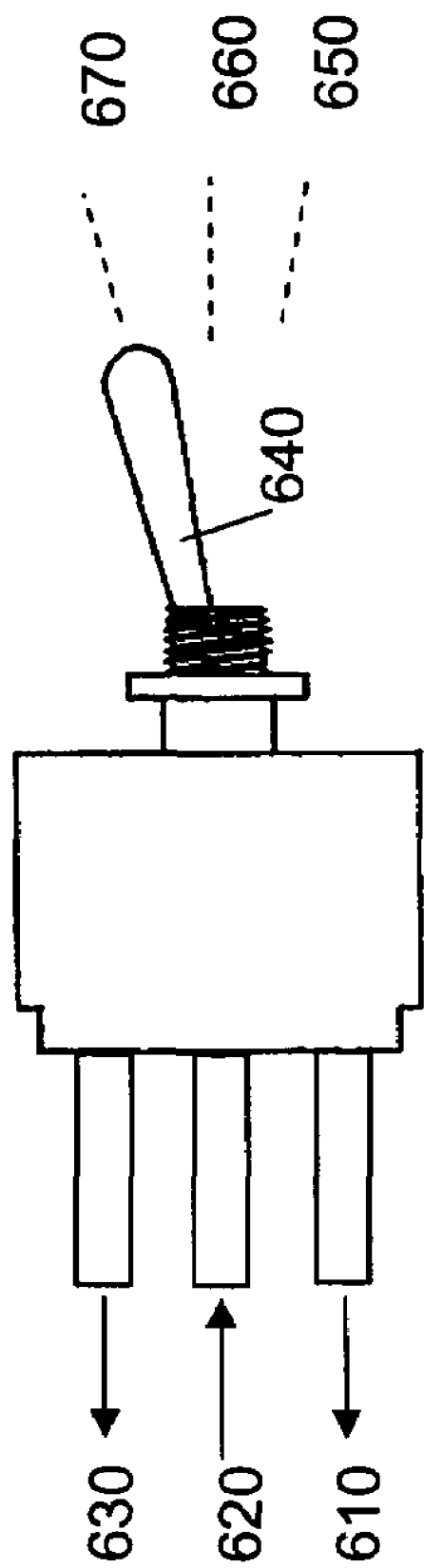
FIG. 6 shows a switch in accordance with an exemplary implementation of the invention.

Though a toggle switch is shown in FIG. 6, other types of switches may be used without departing from the scope of the present invention. For example, a three-position rocker or rotary switch may be utilized. In an alternative embodiment, a solenoid or a motor actuated valve operably coupled to a conventional timing circuit may be used to achieve automatic operation with a timed wiper delay. The timing circuit controls periodic activation of the solenoid or motor to move the switch between positions.

If a single action cylinder is used, only the extension stroke is activated by the switch. In such a case, the return stroke is effectuated by a spring within the pneumatic cylinder. Thus a two-way switch may be used. This push-pull single stroke may be repeated as often as necessary.

Both the driver and passenger side mirrors may be equipped with a wiper system according to the principles of the invention. One switch and airlines with T-fittings may be used to control the flow of compressed air to both wiper systems simultaneously.

Figure 4:
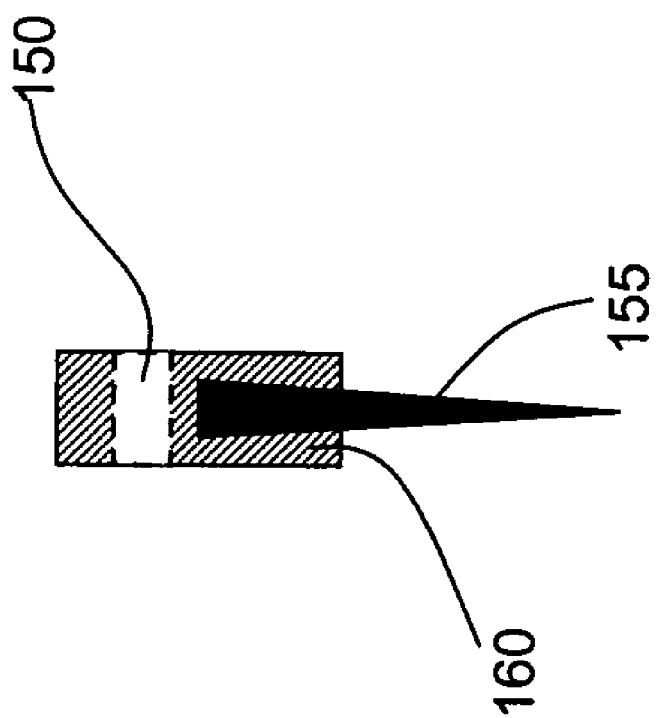
FIG. 4 shows conceptually shows a cross-section of a wiper blade in accordance with an exemplary implementation of the invention.

Referring now to FIG. 4, a cross-sectional view of an exemplary wiper blade is shown. The wiper blade is comprised of a rubber edge 155 extending from a rigid frame 160. A hole 150 provides a means for securely engaging the wiper blade. The threaded end of an operating rod 510 may pass through the hole 150 in the rigid frame. A nut may then secure the wiper blade on the operating rod. Other means for securely engaging a wiper blade that can be attached to an extendible/retractable operating rod of a pneumatic cylinder may also be used without departing from the scope of the invention.

The mirror may be further equipped with a hose 155 and optionally a nozzle oriented to spray washer fluid onto the mirror. A dedicated windshield washer pump may be used to supply windshield washer fluid from a windshield washer reservoir through the hose to the mirror. The dedicated pump may be activated using a switch located in the cab of a truck. Alternatively, the hose 125 for supplying windshield washer fluid to each mirror may be fluidly coupled to the reservoir and pump for supplying the fluid to the windshield. In the latter case, activating the windshield washer pump will supply windshield washer fluid to the mirrors as well as the windshield.

The foregoing is considered as illustrative of the principles of the invention. While the invention has been described in terms of certain embodiments, implementations and examples, those skilled in the art will recognize that the invention can be practiced with modification within the spirit and scope of the appended claims.

We claim the following:

1. A wiper system mounted to a truck mirror, the wiper system comprised of
    a pneumatic cylinder configured for attachment to a compressed air source, said pneumatic cylinder having an operating arm that is extendable and retractable, a stroke of approximately the width of the mirror and being configured for front mounting;
    a mounting bracket attaching the pneumatic cylinder to an exterior surface of the mirror, the mounting bracket being an angled member attached to the front of the pneumatic cylinder, positioning the front of the pneumatic cylinder abutting a first vertical side of the mirror, and attached to an exterior surface of a backside of the mirror, wherein the operating arm extends from the first vertical side toward the second vertical side during extension, and
    a clamping member configured for attaching a wiper blade to the operating arm.

2. A wiper system according to claim 1, further comprising a switch operably coupled to the pneumatic cylinder and configured for selectively controlling a flow of compressed air to the pneumatic cylinder.

3. A wiper system according to claim 2, further comprising at least one air line configured for supplying compressed air to the pneumatic cylinder.

4. A wiper system according to claim 3, wherein the pneumatic cylinder is a double-action pneumatic cylinder.

5. A wiper system according to claim 3, wherein the pneumatic cylinder is a single-action pneumatic cylinder.

6. A wiper system according to claim 3, wherein the switch is configured for manual control of extension and retraction of the operating arm of the pneumatic cylinder.

7. A wiper system according to claim 3, wherein the switch is configured for automatic control of extension and retraction of the operating arm of the pneumatic cylinder.

* * * * *